US012202292B2

(12) United States Patent
Fuchsbauer et al.

(10) Patent No.: US 12,202,292 B2
(45) Date of Patent: Jan. 21, 2025

(54) SUBSTRATE FOR PRODUCING VALUE PAPERS OR SECURITY PAPERS

(71) Applicant: Hueck Folien Gesellschaft M.B.H., Baumgartenberg (AT)

(72) Inventors: Anita Fuchsbauer, Linz (AT); Martin Egginger, Linz (AT)

(73) Assignee: Hueck Folien Gesellschaft M.B.H., Baumgartenberg (AT)

( * ) Notice: Subject to any disclaimer, the term of this patent is extended or adjusted under 35 U.S.C. 154(b) by 0 days.

(21) Appl. No.: 18/028,970

(22) PCT Filed: Sep. 28, 2021

(86) PCT No.: PCT/EP2021/076682
§ 371 (c)(1),
(2) Date: Mar. 28, 2023

(87) PCT Pub. No.: WO2022/069486
PCT Pub. Date: Apr. 7, 2022

(65) Prior Publication Data

US 2023/0331020 A1 Oct. 19, 2023

(30) Foreign Application Priority Data

Sep. 29, 2020 (EP) .................................... 20198899

(51) Int. Cl.

| | |
|---|---|
| ***B42D 25/333*** | (2014.01) |
| ***B42D 25/355*** | (2014.01) |
| ***B42D 25/373*** | (2014.01) |
| ***B42D 25/378*** | (2014.01) |
| *B42D 25/351* | (2014.01) |

(52) U.S. Cl.
CPC ......... *B42D 25/333* (2014.10); *B42D 25/373* (2014.10); *B42D 25/378* (2014.10); *B42D 25/351* (2014.10); *B42D 25/355* (2014.10)

(58) Field of Classification Search
CPC .. B42D 25/333; B42D 25/373; B42D 25/378; B42D 25/355
USPC ................................ 283/72, 74, 94, 98, 901
See application file for complete search history.

(56) References Cited

U.S. PATENT DOCUMENTS

| | | | | |
|---|---|---|---|---|
| 2004/0096648 A1 | 5/2004 | Puttkammer | | |
| 2014/0342105 A1* | 11/2014 | Mayrhofer ............. | B42D 25/47 | 428/29 |
| 2015/0174944 A1 | 6/2015 | Dietemann | | |
| 2018/0093519 A1 | 4/2018 | Dickerson et al. | | |
| 2020/0171875 A1 | 6/2020 | Jolic | | |

FOREIGN PATENT DOCUMENTS

| | | | |
|---|---|---|---|
| DE | 112018003095 | T5 | 3/2020 |
| EP | 1674286 | A1 | 6/2006 |
| EP | 2028017 | A2 | 2/2009 |
| EP | 2578414 | A1 | 4/2013 |
| EP | 3337675 | B1 | 6/2018 |
| FR | 2993204 | A1 | 1/2014 |
| GB | 2387813 | A | 10/2003 |
| RU | 2291490 | C2 | 1/2007 |
| WO | 2019224159 | A1 | 11/2019 |

OTHER PUBLICATIONS

International Search Report dated Dec. 3, 2021 for copending Int. App. No. PCT/EP2021/076682 (w_English_translation).

* cited by examiner

*Primary Examiner* — Justin V Lewis
(74) *Attorney, Agent, or Firm* — FisherBroyles, LLP

(57) ABSTRACT

A substrate for producing papers of value or security papers is described. The substrate may include a carrier layer, at least one security element applied at least one of onto and into the carrier layer, and a primer. The primer may be applied onto at least one of a first substrate side and a second substrate side of the substrate. The primer may be arranged, at least in some sections, between the carrier layer and the at least one security element. Additionally and/or alternatively, the primer may cover the at least one security element and/or the carrier layer such that regions of the at least one security element covered by the primer are not as well visible as regions of the at least one security element and/or the carrier layer not covered by the primer. The at least one security element may include a partial, reflective layer forming an image.

23 Claims, 3 Drawing Sheets

SUBSTRATE FOR PRODUCING VALUE PAPERS OR SECURITY PAPERS

CROSS-REFERENCE TO RELATED APPLICATIONS

This application claims priority to International Patent Application No. PCT/EP2021/076682, filed on Sep. 28, 2021, and European Patent Application No. EP20198899.5, filed on Sep. 29, 2020, the contents of both of which are hereby incorporated by reference in their entirety.

TECHNICAL FIELD

The disclosure relates to a substrate for producing papers of value or security papers and a paper of value or security paper.

BACKGROUND

Substrates, and particularly polymer substrates, as well as papers of value or security papers of the initially mentioned type are usually used to increase protection against forgery of papers of value or security papers, such as banknotes, identification cards, credit cards, debit cards, tickets.

According to the prior art, there are attempts to realize protection against forgery by means of shadow images or watermarks. For example, from the DE112018003095T5, an optical security feature is known which is accommodated in polymer-based banknotes. In this regard, an image contained in a clouding layer of a polymer substrate of a polymer-based banknote is more visible in transmission than in reflection. However, the known embodiments have coincidence errors, which limits the complexity and thus the protection against forgery of the shadow images. Higher-quality shadow images or watermarks can thus not be realized.

OVERVIEW

The object of the present disclosure was to overcome the shortcomings of the prior art and to provide means, by means of which papers of value or security papers, in particular polymer papers of value or polymer security papers, can be produced and/or designed with one or multiple highly forgery-proof security elements.

This object is achieved by a substrate, in particular a polymer substrate, and/or by a paper of value or security paper according to the claim(s).

The disclosure relates to a substrate for producing papers of value or security papers, wherein the substrate comprises a carrier layer, in particular a polymer carrier layer, and at least one security element, and wherein the security element is applied onto and/or into the carrier layer. In this regard, a primer is applied onto a first substrate side and/or a second substrate side of the substrate at least in some sections. In this regard, the primer is arranged, at least in sections, between the carrier layer and the security element and/or the primer covers the security element and/or the carrier layer at least in sections, wherein regions of the security element covered by the primer are less well visible than regions of the security element not covered by the primer and/or than regions of the carrier layer not covered by the primer. According to the disclosure, the security element is embodied having a partial, reflective layer that forms an image.

The term primer may describe both an individual layer and a composite or a layering made up of multiple layers.

This may mean, in this regard, for example multiple identical, but also multiple different, plies or layers. At this point, it should be noted that the phrase “a layer is applied onto something” is to be understood as meaning that a layer may be applied directly, or that between the applied layer and that to which the layer is applied, one or multiple intermediate layers may be present. At this point, it should also be noted that between the layers described in this document, one or multiple intermediate layers may also be arranged. It is thus not absolutely necessary that the described layers contact one another. Moreover, it should be noted that in this document, the term layer is to be understood such that a layer may consist of multiple partial layers. The term image may mean any type of signs, letters, patterns, motives, geometric figures, guilloches, and also lines.

It should also be noted that the term “in particular” is to be understood, in this document, to mean that a possible more particular embodiment or more detailed specification of an object is referred to, but does not necessarily constitute a compulsory, preferred embodiment of the same or a compulsory approach.

The substrate according to the disclosure creates the possibility and/or base for producing papers of value or security papers with one or multiple highly forgery-proof security elements. Especially if the substrate is a polymer substrate, a banknote manufacturer is supplied with a base material which can generally be further processed like or similar to paper for paper banknotes. Thus, a banknote manufacturer may, for example, produce both paper banknotes and polymer banknotes using the same machines and/or process steps, or also by making minor modifications. This entails advantages with respect to an economy of the entire production chain with a simultaneously high product quality.

By means of the security element(s) formed in or on the substrate, an additional degree of protection against forgery is ensured, as a visibility of the security element(s) is decreased as a result of the applied primer. Those regions on the first and/or on the second substrate side, on or in which a security element covered with a primer is formed, can, according to the disclosure, be perceived less well and/or less clearly than those regions of the carrier layer with and/or without a primer on top of it. The primer, which serves to cover the security element(s), but which also may allow a later individual printing of the substrate by the banknote manufacturer, is applied, according to the disclosure, onto the security element(s) and/or onto the carrier layer at least in sections, so that at least selected regions are covered and are at least less and/or less clearly visible or visible in a less strongly contrasted manner. This effect, that regions covered by the primer are not as well visible as regions not covered by the primer, becomes apparent and/or perceivable for an observer especially when they observe that substrate side of the substrate onto which the primer is applied. Of course, the substrate may also have a primer on both sides. In these embodiments, the effect of the decreased visibility of covered regions would be apparent on both substrate sides. It is also possible that the security element(s) are arranged on or in both outer surfaces of the carrier layer.

For example, security elements may be formed as example threads, security strips and the like, wherein, of course, other advantageous types and/or designs known to the person skilled in the art are conceivable.

According to an advantageous advancement, the image formed by the partial, reflective layer may be embodied as a mosaic-like image. The embodiment of security elements with a partial, reflective layer and a layer forming a mosaic-like image is known, for example, from EP1674286A1. Thus, images with a realistic effect, high resolution and high quality and/or detail richness, such as, in particular raster images of, for example, metallized pixels and/or grid points, can be represented, wherein regions with different optical densities may also be realizable. If a corresponding security element is applied into or onto a substrate, for example, as a thread, strip, or as a transfer thread film, and accordingly, prints over the entire surface or also only sections with the primer, the image and/or security element is effectively made into a shadow image or watermark, or is perceived as such by an observer. The primer acts, in this context, like a clouding layer. As, at times, different optical densities of different image regions can be achieved, multistage watermarks can be realized.

Furthermore, it may be useful if the regions of the security element covered by the primer are not visible from a top view and are visible when looking through, or that the regions of the security element covered by the primer are better visible when looking through than from a top view. This advantageous embodiment may make it easier for a user to verify the authenticity of a banknote by holding it against a light or looking through it. Hence, a further contribution to the protection against forgery of banknotes can be made. Here, it is also possible that, when looking through, not the entire region of the security element covered by the primer is visible, but only those parts or regions of the element, which are formed having the partial, reflective layer forming an image. Hence, merely a partial metallization or also a partial HRI layer—that is a layer with a high refractive index (HRI)—and/or the image, in particular also a mosaic-like image, formed thereby can be seen in transmitted light. In case of a partial metallization, or also in the case of a partial HRI layer, the layer may contain—just to name a few examples—cutouts in the form of signs, letters, patterns, motives, geometric figures, guilloches, and also lines.

The substrate may be both a polymer substrate and a paper substrate. In this document, particularly the terms substrate or polymer substrate are used in the following, wherein it may possibly be useful to use a paper substrate instead of a polymer substrate. While a polymer substrate comprises a polymer carrier layer, a paper substrate comprises a paper carrier layer and/or a paper substrate is made from a cellulose-fiber based pulp.

Particularly when the primer is arranged, at least in some sections, between the carrier layer and the security element, it may also be advantageous if the security element and/or the carrier layer and/or the primer are covered, at least in some sections, by a cover layer. In this regard, regions of the security element covered by the cover layer may be not as well visible as regions of the security element not covered by the cover layer and/or as regions of the carrier layer not covered by the cover layer and/or as regions of the primer not covered by the cover layer. This way, optical effects can be obtained and, in particular, a visibility contrast between regions with a cover layer and regions without a cover layer can be caused by means of printing over selected regions—for example also in the course of printing banknotes. Such an advancement may particularly be useful when using a polymer substrate.

Furthermore, it may be provided that the primer is applied by means of a printing method. Thereby, a uniform and even primer and/or primer layer can be realized in an economical manner. This may be advantageous particularly for further processing the substrate in the course of subsequent banknote printing and may contribute to a high product quality.

Apart from printing methods, it would also be conceivable and possibly advantageous if the primer is applied by means of lacquering, dip coating, spray coating, or roller coating. Applying the primer by means of vacuum-based coating methods, such as plasma coating or PVD and CVD coating, is also conceivable.

In addition to this, it may be provided that the primer is designed to be printable. A good printability may be of importance in further processing of the substrate when printing banknotes and may at times, make a satisfactory or also high final quality of a paper of value or security paper, in particular of a polymer paper of value or polymer security paper possible. Additionally, a good printability of the primer or the substrate may have a positive effect on the durability and/or resilience of a banknote. For example, a good printability may be realized by means of an even primer, or also by means of a structure taking on the printing ink well, or the material of the primer.

An embodiment, according to which it may be provided that the primer covers the carrier layer and/or the security element across the entire surface, is also advantageous. It may, at times, be favorable for reasons of protection against forgery of banknotes if the security element(s) are completely covered and thus, are only barely and/or not clearly visibly from a top view.

According to an advancement, it is possible that the primer partially covers the carrier layer and/or the security element. Such regions of the security element(s), which are not covered by the primer and are thus visible from a top view, are customarily referred to as windows. Security element configured like this in the form of a thread are often referred to as window thread. Such windows may be formed as so-called half windows or also as full windows. Half windows are cutouts in the primer on only one substrate side of the substrate and/or on one side of the primer. If the primer is applied on both substrate sides of the substrate and if cutouts are provided to be opposite one another or at least partially opposite and/or overlapping in the two-sided primer, the technical jargon refers to a full window. These windows may make it easier for a user to verify the authenticity of a banknote easily and quickly. Additionally, the partial covering of one or multiple security features may improve a protection against forgery since an imitation and/or forgery of banknotes is made considerably more difficult by an exact positioning of windows.

Advantageously, the security element may be formed as a security thread with a partial, reflective layer forming an image, wherein the image may be formed multiply and/or repeatedly on the thread. Particularly when the primer is applied and/or printed onto the security thread in a partial and true-to-register manner, it is possible that the repeating image is visible in the windows and appears in the printed-over and/or primed regions as a watermark. Thus, using one single security element and/or thread, two security effects can be achieved at the same time. Alternatively or additionally thereto, it may also be advantageous if a continuous and/or individual image or motive is covered, in some sections, by the primer. Thus, it may be, for example, that a part of an image, such as a part of a portrait, is located in a window, meaning it is not covered by the primer. The other part of the portrait may, in this regard, be located in a bridge region, that is a region covered by the primer. Particularly when the security feature and/r the partial, reflective layer forming an image is produced in the course of one working and/or production step and is subsequently sectionally covered by the primer, a very high-quality and thus highly forgery-proof substrate can be produced. The obtainable congruence between the two parts of the continuous image and/or portrait is not subjected to register fluctuations.

Furthermore, it may be useful if the primer is formed to be diffusely scattering, in particular that the primer creates a white color impression in daylight. This embodiment may have a positive effect particularly on a banknote manufacturable from the substrate, since a white primer layer and/or surface may allow for a particularly high-quality subsequent printing or other application of motives, numbers, and the like. Such layers and/or primers are also known as "opacifying layers" in the English language. The ink used in this is also referred to as opaque ink.

Furthermore, it may be provided, particularly in the case of polymer substrates, that the carrier layer is made from plastic, in particular a translucent plastic, wherein the carrier layer preferably comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers and/or composite materials of these materials or is made of at least one of these materials.

Furthermore, it may be provided that the carrier layer has a thickness of 5 μm to 700 μm, preferably 30 μm to 150 μm, particularly preferably 50 μm to 125 μm, in particular 65 μm to 90 μm.

According to a particular embodiment, it is possible that the primer has a thickness of 1 μm to 60 μm, preferably 5 μm to 50 μm, particularly preferably 7 μm to 45 μm, in particular 10 μm to 40 μm. A low thickness of the primer may be advantageous insofar as it may contribute to a thin substrate. End products such as paper and polymer banknotes should have a low thickness, so that they are easily printable and also easily stackable in a space-saving manner. For this purpose, an advantageous base can be created by forming a thin yet covering primer.

According to an advantageous advancement, it may be provided that the at least one security element or at least one further security element is formed having an optically variable feature, having a feature which is optically discernible in transmission or reflection, having a machine-readable feature and/or by means of substances and/or features absorbing or re-emitting electromagnetic waves. In this regard, this may be an embossed layer, a fluorescent layer, a printed layer, a magnetic encoding and/or an optically variable feature, in particular a hologram and/or a color-shifting base layer, for example a base layer having at least one color-shifting thin-layer element. With this, a user may select from a great portfolio and a plurality of possible combinations of security features, whereby a high degree of protection against forgery can be realizable. Machine-readable features may be, in particular, magnetic coding, electrically conductive layers, or also substances absorbing and/or re-emitting electromagnetic waves.

In particular, it may be advantageous if the partial, reflective layer forming an image comprises at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or at least one high refractive index dielectric material having a refractive index of larger than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or layers of metal oxides, like, for example, non-stoichiometric aluminum oxide, copper oxides, or chromium oxides, and/or is made of at least one metal material of printing inks or lacquers with metal pigments, in particular selected from the group of aluminum, silver, copper, gold, platinum, niobium, tin, or of nickel, titanium, vanadium, chromium, cobalt and palladium, or alloys of these materials, in particular cobalt-nickel alloys.

Here, an embodiment would be conceivable and advantageous, in which the security element is formed having a partial, reflective layer forming an image, wherein the layer has a region, which comprises a metal material and has a further region, which comprises an HRI material. In this regard, the primer may cover that region which comprises a metal material and leaves that region which comprises the HRI material. In the application true to register, this may take place without a displacement perceptible for an observer and/or with a very good optical congruence with the region margins and/or transitions. When observing such an arrangement in reflection, the image in the window, that is in the spared region comprising an HRI material, may be perceptible to an observer and be invisible in the bridge region, that is the covered region comprising a metal material. When observing this arrangement in transmitted light, an opposite optical effect may be achievable. In this regard, the image in the spared region comprising an HRI material would be invisible to an observer, and the image in the bridge region, that is the covered region comprising a metal material, would be perceivable as a watermark. In this regard, the image may be a continuous motive, which consists of multiple differently formed regions, or the image may be formed by multiple motives, symbols, or the like, wherein each motive or symbol may be formed by a separate region.

According to an advantageous advancement, the carrier layer and the primer may comprise the same material, in particular comprise the same cellulose-fiber based material. This may be useful especially when the substrate is a paper substrate. In this regard, the paper substrate may be manufactured from a pulp, that is a watery suspension comprising a cellulose material, in a—preferably continuous—method step. In this process, the carrier layer may be produced, wherein the security element may be introduced and/or blown in, for example, in the form of a security thread, on which security element a primer formed of the same pulp may simultaneously be applied partially or over the entire surface. The primer, which may be formed of a paper like the carrier layer, may, in this process, be printed on subsequently during a printing of banknotes.

Furthermore, it may be provided that the image formed of the partial, reflective layer is formed of image elements, which are of different sizes and shapes, wherein an image element is formed by a continuous area of the partial, reflective layer forming the image, and wherein the partial, reflective layer forming the image is interrupted between two image elements. Image element effectively refers to an individual grid point and/or an individual grid area. Here, it may be particularly advantageous if the image formed by the partial, reflective layer is embodied as a mosaic-like image.

Furthermore, it may be provided that image elements of different sizes correspond to different mosaics of the mosaic-like image.

An embodiment, according to which it may be provided that regions interrupting the partial, reflective layer forming an image are formed by removing the layer, in particular by means of demetallization, is also advantageous. The removal operation may be performed, for example in the course of washing or etching processes. Particularly if the partial, reflective layer forming an image is a metallic layer, the removal can be performed by means of demetallization. In this regard, both so-called positive images and negative images can be realized. In the case of positive images, the image is formed by the metallized regions of the layer, whereas in the case of negative images, the image is formed by the demetallized regions of the layer. When observing through transmitted light, positive images appear as a dark image on a light background, whereas negative images appear as a light image on a dark background.

According to an advancement, it is possible that a thickness of the partial, reflective layer forming an image is the same in all non-spared regions of the layer.

Furthermore, it may be useful if a thickness of the partial, reflective layer forming an image is different in at least two of the non-spared regions of the layer. Thus, different optical densities and/or multilayer shadow images can be realized.

Furthermore, it may be provided that the security element has one or multiple additional layers, said additional layers comprising, in particular, protective lacquers, heat-sealing lacquers, adhesives, primers and/or films.

According to the disclosure, a paper of value or security paper, in particular a polymer paper of value or polymer security paper, is also provided having at least one security element comprising a substrate, wherein the substrate is formed according to the claims.

The paper of value or security paper according to the disclosure allows producing papers of value or security papers with one or multiple highly forgery-proof security elements. If the substrate is a polymer substrate, a banknote manufacturer is supplied with a base material which can generally be further processed like or similar to paper for paper banknotes. Thus, a banknote manufacturer may, for example, produce both paper banknotes and polymer banknotes using the same machines and/or process steps, or also by making minor modifications. This entails advantages with respect to an economy of the entire production chain with a simultaneously high product quality.

By means of the security element(s) formed in or on the substrate, an additional degree of protection against forgery is ensured, as a visibility of the security element(s) is decreased as a result of the applied primer. Those regions on the first and/or on the second substrate side, on or in which a security element covered with a primer is formed, can, according to the disclosure, be perceived less well and/or less clearly than those regions of the carrier layer with and/or without a primer on top of it. The primer, which serves to cover the security element(s), but which also may allow a later individual printing of the substrate by the banknote manufacturer, is applied, according to the disclosure, onto the security element(s) and/or onto the carrier layer at least in sections, so that at least selected regions are covered and are at least less and/or less clearly visible or visible in a less strongly contrasted manner. This effect, that regions covered by the primer are not as well visible as regions not covered by the primer, becomes apparent and/or perceivable for an observer especially when they observe that substrate side of the substrate onto which the primer is applied. Of course, the substrate may also have a primer on both sides. In these embodiments, the effect of the decreased visibility of covered regions would be apparent on both substrate sides. It is also possible that the security element(s) are arranged on or in both outer surfaces of the carrier layer.

For example, security elements may be formed as example threads, security strips and the like, wherein, of course, other advantageous types and/or designs known to the person skilled in the art are conceivable.

According to an advantageous advancement, the image formed by the partial, reflective layer may be embodied as a mosaic-like image. The embodiment of security elements with a partial, reflective layer and a layer forming a mosaic-like image is known, for example, from EP1674286A1. Thus, images of metallized pixels and/or grid points with a realistic effect, high resolution and high quality and/or detail richness can be represented, wherein regions with different optical densities may also be realizable. If a corresponding security element is applied into or onto a substrate, for example, as a thread, strip, or as a transfer thread film, and accordingly, prints over the entire surface or also only sections with the primer, the image and/or security element is effectively made into a shadow image or watermark, or is perceived as such by an observer. The primer acts, in this context, like a clouding layer. As, at times, different optical densities of different image regions can be achieved, multistage watermarks can be realized.

For the purpose of better understanding of the disclosure, it will be elucidated in more detail by means of the figures below.

BRIEF DESCRIPTION OF THE DRAWINGS

These show in a respectively very simplified schematic representation.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
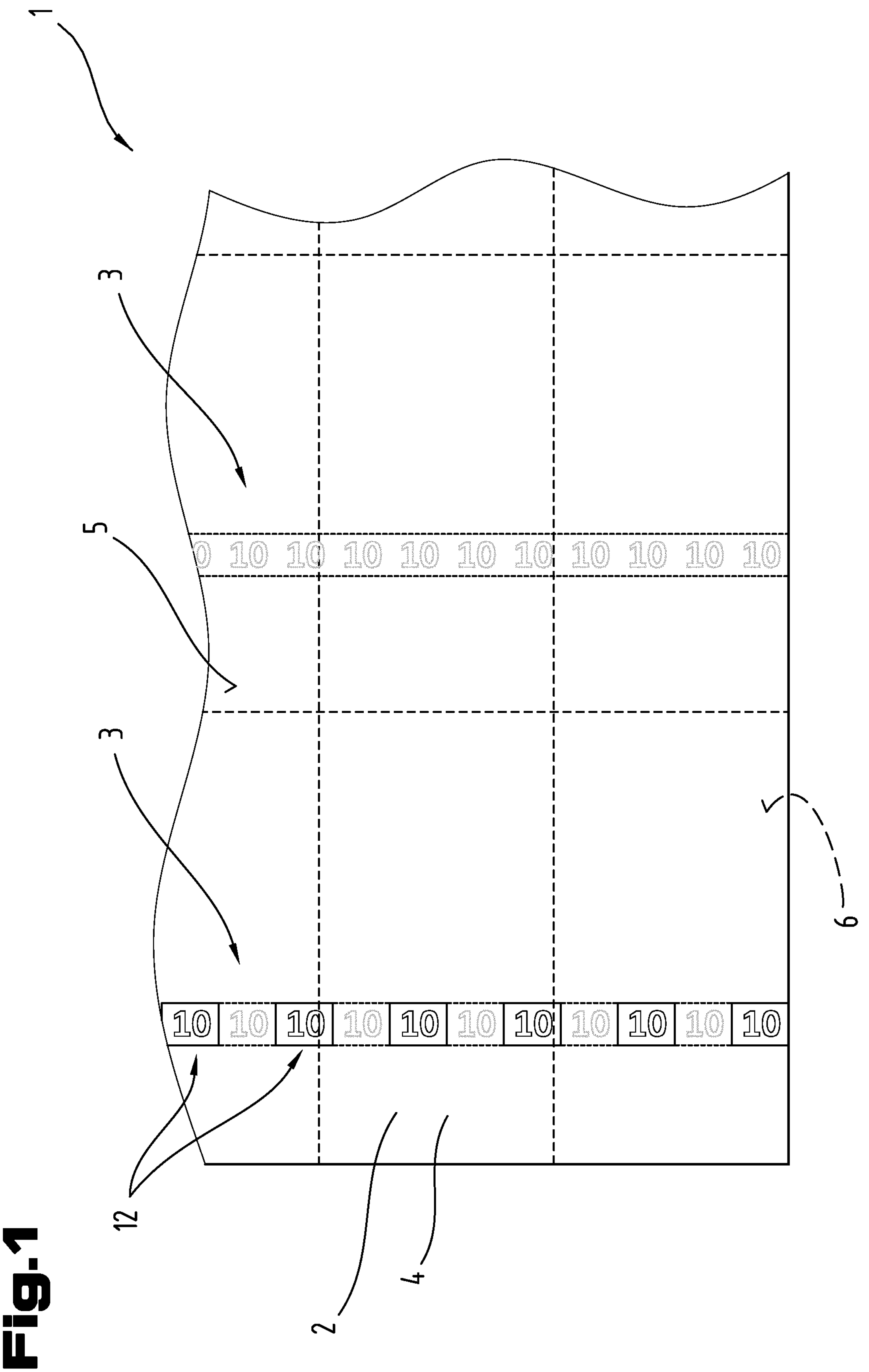
FIG. 1 shows an embodiment of a substrate in a top view.

FIG. 1 shows a substrate 1 for producing papers of value or security papers. In this regard, it is provided that the substrate 1 comprises a carrier layer 2 and at least one security element 3, wherein the security element 3 is applied onto and/or into the carrier layer 2, and wherein a primer 4 is applied onto a first substrate side 5 and/or a second substrate side 6 of the substrate 1 at least in some sections. In this regard, the primer 4 covers the security element 3 and/or the carrier layer 2 at least in some sections, wherein regions of the security elements 3 covered by the primer 4 are not as well visible as regions of the security element 3 not covered by the primer 4 and/or as regions of the carrier layer 2 not covered by the primer 4. Additionally, it is provided that the security element 3 is formed having a partial, reflective layer 7 forming an image. In this regard, it is possible that the image formed by the partial, reflective layer 7 is embodied as a mosaic-like image.

In this regard, the regions of the security element 3 covered by the primer 4 may not be visible from a top view and visible when looking through it, or the regions of the security element 3 covered by the primer 4 may be better visible when looking through than from a top view. The primer 4 may be applied by means of a printing method. Additionally, the primer 4 may be formed to be printable.

In particular, FIG. 1 shows a cutout and/or partial region of a sheet of a substrate 1 in a top view, wherein the substrate 1 may be either a polymer substrate or also a paper substrate. In this regard, the substrate 1 and/or the sheet is divided into zones by means of finely dashed lines, which zones mark the regions for papers of value and/or security papers that can be tailored from the substrate 1 and/or from the processed substrate 1. In both columns shown, security elements 3 embodied as security threads are shown. The primer 4 may partially cover the carrier layer 2 and/or the security element 3. Such a partial covering of a security element 3 embodied as a security thread is shown in the first column. The security thread, on which the number ten is reproduced repeatedly by means of a partial, reflective layer 7 forming an image, is, in this regard, alternatingly covered or not covered by the primer 4. In the covered regions, the number ten is perceived, in each case, as a shadow image and/or watermark, and in the regions that are not covered as a "normal" and/or conventional image or also as a mosaic-like image and/or raster image. Thus, two security effects may be realized by means of one and the same security element 3. Regions or sections not covered by the primer 4 are perceived as so-called windows 12 by an observer looking at the substrate 1 from above. If these windows 12 are only on one side of the substrate 1, said windows 12 are also referred to as half windows. If the regions not covered by the primer 4 are opposite one another, the windows 12 formed thereby are referred to as full windows. The primer 4 may, however, also cover the carrier layer 2 and/or the security element 3 over its entire surface and/or completely. Such a full-surface covering of a security element 3 embodied as a security thread is shown in the second column of FIG. 1. Here, as well, the security thread repeatedly shows the number ten by means of a partial, reflective layer 7 forming an image, wherein the entire security thread can be perceived by an observer as a shadow image and/or watermark. The primer 4 may also be formed to be diffusely scattering. In particular, the primer 4 may have a white color impression in daylight.

The carrier layer 2 may be produced from a plastic, in particular a translucent plastic, wherein the carrier layer 2 may preferably comprise at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers and/or composite materials of these materials or may be made of at least one of these materials.

The at least one security element 3 or at least one further security element 3 may be formed having an optically variable feature, having a feature which is optically discernible in transmission or reflection, having a machine-readable feature and/or by means of substances and/or features absorbing or re-emitting electromagnetic waves.

The partial, reflective layer 7 forming an image may comprise at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or at least one high refractive index dielectric material having a refractive index of larger than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Se_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or layers of metal oxides, like, for example, non-stoichiometric aluminum oxide, copper oxides, or chromium oxides, and/or may be made of at least one metal material of printing inks or lacquers with metal pigments, in particular selected from the group of aluminum, silver, copper, gold, platinum, niobium, tin, or of nickel, titanium, vanadium, chromium, cobalt and palladium, or alloys of these materials, in particular cobalt-nickel alloys.

Here, an embodiment would also be conceivable and advantageous, in which the security element 3 is formed having a partial, reflective layer 7 forming an image, wherein the layer 7 has a region, which comprises a metal material and has a further region, which comprises an HRI material. In this regard, the primer 4 may cover that region which comprises a metal material and leaves that region which comprises the HRI material. In the application true to register, this may take place without a displacement perceptible for an observer and/or with a very good optical congruence with the region margins and/or transitions. When observing such an arrangement in reflection, the image in the window 12, that is in the spared region comprising an HRI material, may be perceptible to an observer and be invisible in the bridge region, that is the covered region comprising a metal material. When observing this arrangement in transmitted light, an opposite optical effect may be achievable. In this regard, the image in the spared region comprising an HRI material would be invisible to an observer, and the image in the bridge region, that is the covered region comprising a metal material, would be perceivable as a watermark. In this regard, the image may be a continuous motive, which consists of multiple differently formed regions, or the image may be formed by multiple motives, symbols, or the like, wherein each motive or symbol may be formed by a separate region.

The carrier layer 2 and the primer 4 may comprise the same material, in particular the same cellulose-fiber based material. This may be useful especially when the substrate 1 is a paper substrate. In this regard, the paper substrate may be manufactured from a pulp, that is a watery suspension comprising a cellulose material, in a—preferably continuous—method step. In this process, the carrier layer 2 may be produced, wherein the security element 3 may be introduced and/or blown in, for example, in the form of a security thread, on which security element 3 a primer 4 formed of the same pulp may simultaneously be 4 applied partially or over the entire surface. The primer 4, which may be formed of a paper like the carrier layer 2, may, in this process, be printed on subsequently during a printing of banknotes.

The image formed by the partial, reflective layer, which image repeatedly reproduces the number ten according to the example in FIG. 1, may be formed by image elements 10 of different sizes and shapes, wherein an image element 10 may be formed by a continuous area of the partial, reflective layer 7 forming the image, and wherein the partial, reflective layer 7 forming the image may be interrupted between two image elements 10. Here, it may be particularly advantageous if the image formed by the partial, reflective layer 7 is embodied as a mosaic-like image. It is also possible that image elements 10 of different sizes correspond to different mosaics of the mosaic-like image. The regions interrupting the partial, reflective layer 7 forming an image may be formed by removing the layer 7, particularly by means of demetallization.

The security element 3 may have one or multiple additional layers, which additional layers may comprise, in particular, protective lacquers, heat-sealing lacquers, adhesives, primers and/or films. The substrate 1, as well, may have one or multiple additional layers, as is sufficiently known to the person skilled in the art. Hence, it is also possible that the security element 3 and/or the carrier layer 2 and/or the primer 4 are covered by a cover layer at least in some sections, wherein regions of the security element 3 covered by the cover layer may not be as well visible can be regions of the security element 3 not covered by the cover layer and/or as regions of the carrier layer 2 not covered by the cover layer and/or as regions of the primer 4 not covered by the cover layer. This is true, particularly when the primer 4 is arranged, at least in some sections, between the carrier layer 2 and the security element 3.

From the substrate 1 according to the exemplary embodiment in FIG. 1, a paper of value or security paper having at least one security element 3 comprising the substrate 1 can be produced, wherein the substrate 1 is formed according to one of the claims.

Figure 2:
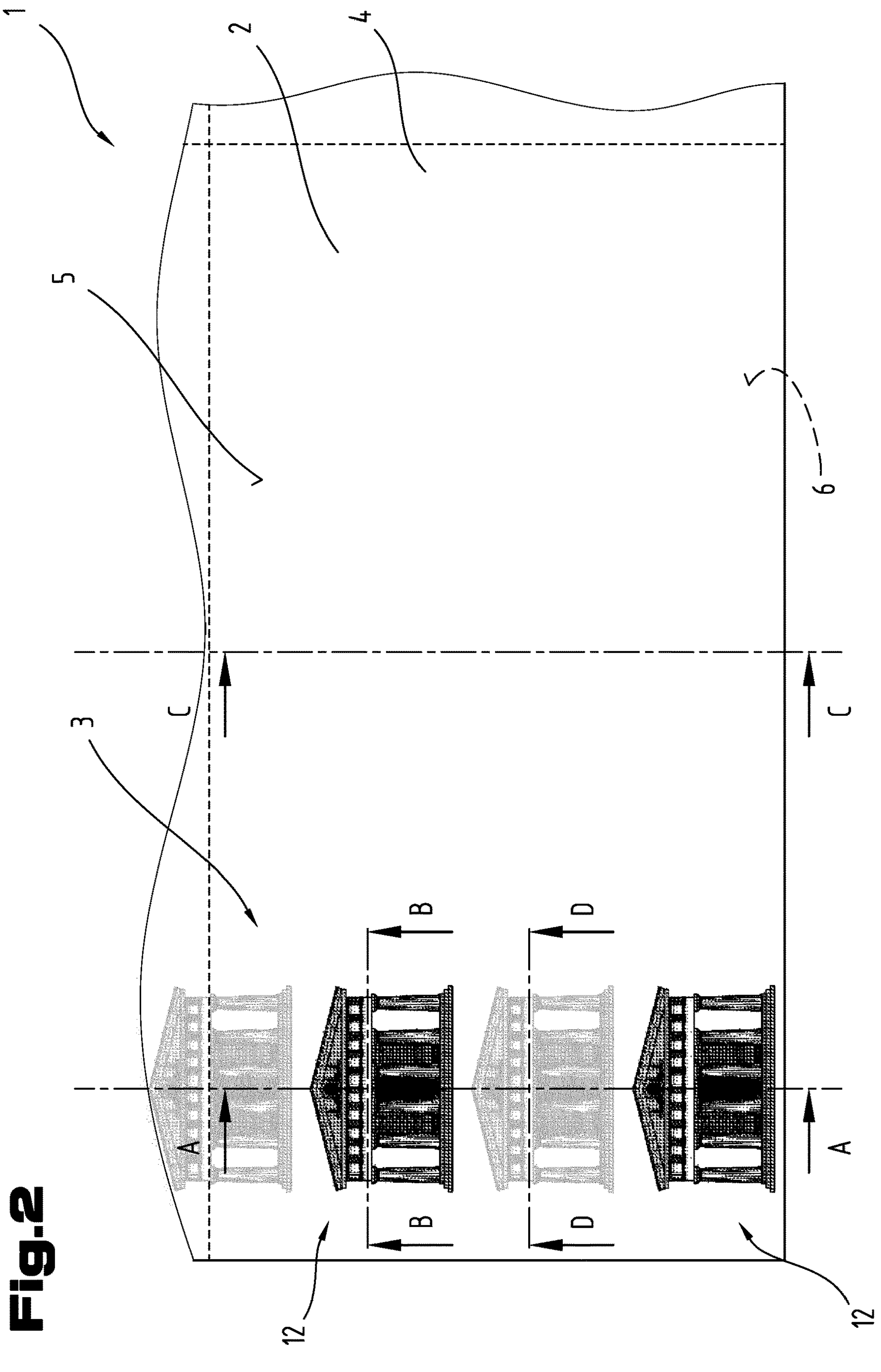
FIG. 2 shows a further embodiment of a substrate in a top view.

In FIG. 2, as well as FIGS. 3A to 3D, a further and possibly independent embodiment of the substrate 1 is shown, wherein equal reference numbers and/or designations are used for equal parts as in FIG. 1 above. The substrate 1 may, in particular, be a polymer substrate or a paper substrate. In order to avoid unnecessary repetitions, at this point, it is therefore pointed to/reference is made to the detailed description in FIG. 1.

FIG. 2 shows a further embodiment of the substrate in a top view 1, wherein, in particular, a region, marked by dashed lines, of a paper of value or security paper that can be tailored from the substrate 1 is shown. A security element 3 in the form of a security thread is applied onto the substrate 1, which repeatedly reproduces a motive in the form of a temple. For this purpose, the security element 3 is embodied having a partial, reflective layer 7 that forms an image. The primer 4 covers the carrier layer 2 over its full surface the security element 3 partially. At the locations where the security element 3 is partially covered by the primer 4, the motive and/or the temple shown appears as a watermark and/or shadow image.

FIGS. 3A to 3D shown four cross-sections of the substrate 1 from FIG. 2, wherein the respective sectioning positions in FIG. 2 are marked, at the corresponding points, by means of arrows and letters. By way of example, the primer 4 is applied only on the first substrate side 5. Of course, however, it would also be conceivable and possibly useful if the primer 4 is also applied, at least in some section, on the second substrate side 6. Of course, it is also conceivable that the security element 3 one or multiple additional layers, which additional layers may comprise, in particular, protective lacquers, heat-sealing lacquers, adhesives, primers and/or films. For the sake of simplicity, and also because the formation of such layers and their technical advantages are sufficiently known to experts, the representation and conceivable arrangements of said layers in the Figures is dispensed with.

FIGS. 3A to 3D show that the image formed by the partial, reflective layer 7 may be formed of image elements 10, which may be of different sizes and shapes, wherein an image element 10 is formed by a continuous area of the partial, reflective layer 7 forming the image, and wherein the partial, reflective layer 7 forming the image may be interrupted between two image elements 10. Here, it may also be particularly advantageous if the image formed by the partial, reflective layer 7 is embodied as a mosaic-like image. It is also possible that image elements 10 of different sizes correspond to different mosaics of the mosaic-like image. The regions interrupting the partial, reflective layer 7 forming an image may be formed by removing the layer 7, particularly by means of demetallization.

Figure 3B:
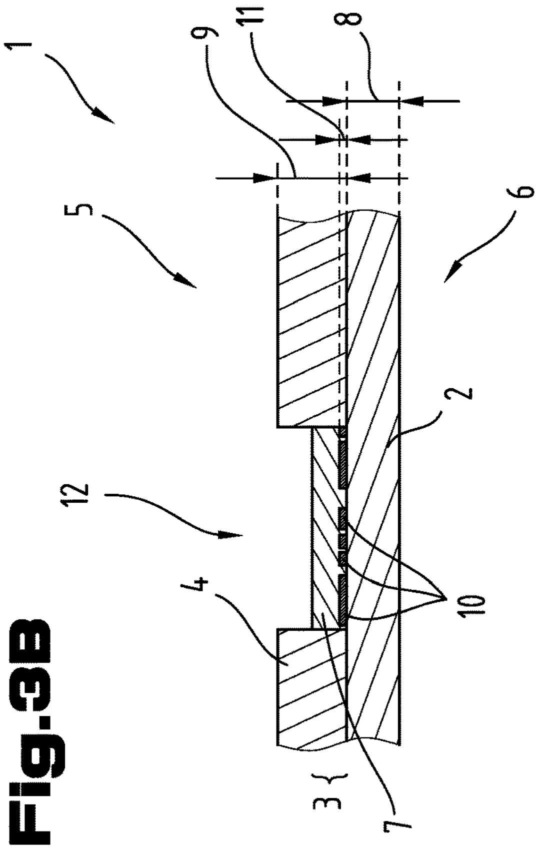
FIG. 3 shows four cross-sections of the substrate from FIG. 2.
Figure 3D:
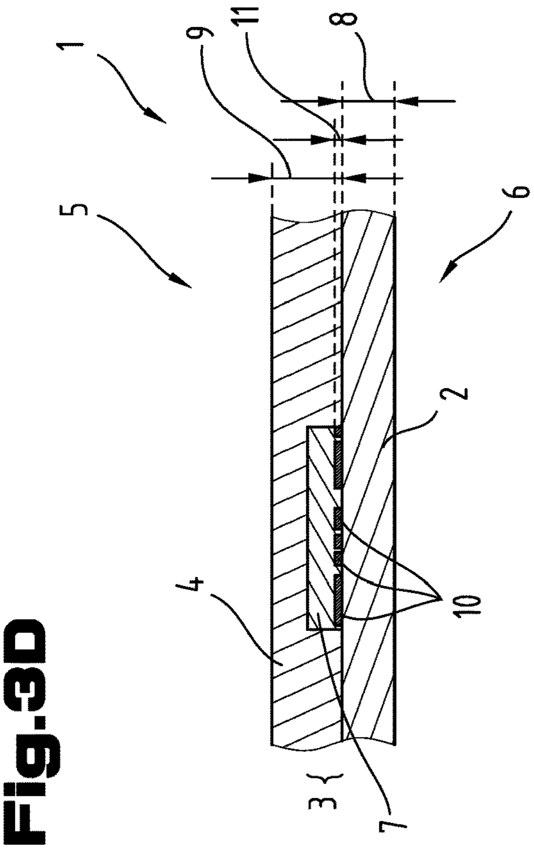
Figure 3A:
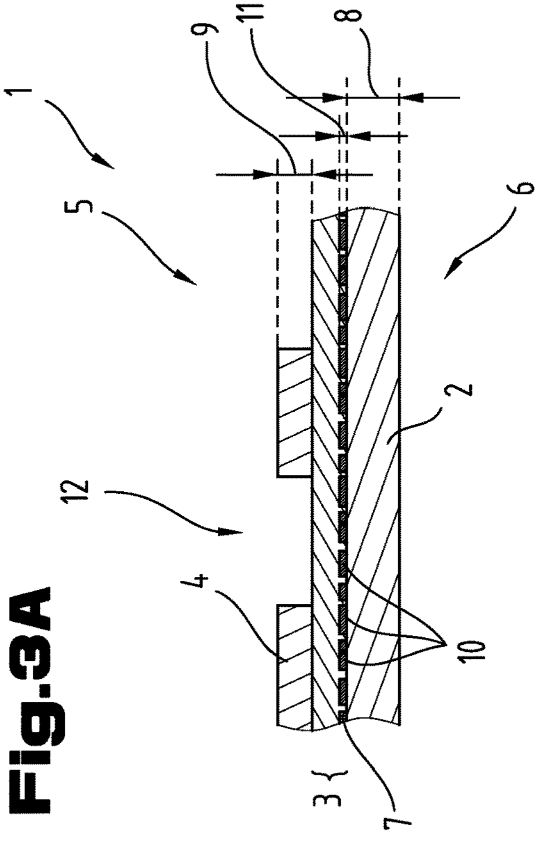
Figure 3C:
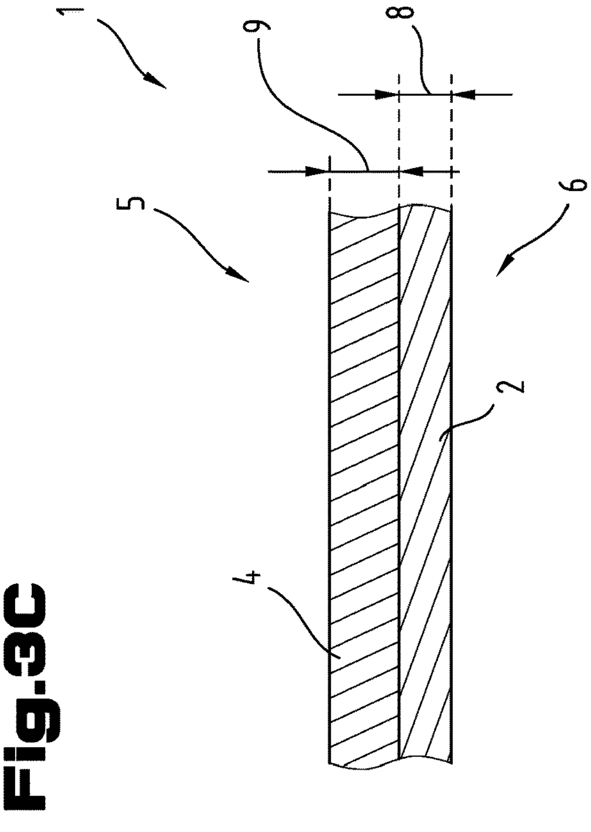

FIG. 3A shows a longitudinal section through the security element 3 formed as a security thread. The areas not covered by the primer 4 are embodied as windows 12. FIG. 3C shows a longitudinal section through the substrate 1 in that region which is formed without a security element 3, wherein the primer 4 covers the carrier layer 2 completely. FIG. 3B shows a section through the temple motive of the security element 3, wherein the primer 4 and the security element 3 are not covered here and thus, a window 12 is formed. In that window 12, the temple motive is perceivable as a raster image. FIG. 3D shows a section through the temple motive of the security element 3, wherein the primer 4 covers the security element 3 completely in this case. Here, the temple motive is identifiable as a high-resolution shadow image and/or watermark.

The carrier layer 2 may have a thickness 8 of 5 μm to 700 μm, preferably 30 μm to 150 μm, particularly preferably 50 μm to 125 μm, in particular 65 μm to 90 μm. The primer 4 may have a thickness 9 of 1 μm to 60 μm, preferably 5 μm to 50 μm, particularly preferably 7 μm to 45 μm, in particular 10 μm and 40 μm.

A thickness 11 of the partial, reflective layer 7 forming the image may be the same in all non-spared regions of the layer 7—as is shown by way of example in FIGS. 3A, 3B and 3D.

However, it is also possible that a thickness 11 of the partial, reflective layer 7 forming the image is different in at least two of the non-spared regions of the layer 7, wherein this conceivable embodiment is not shown by a figure.

The exemplary embodiments show possible embodiment variants, and it should be noted in this respect that the disclosure is not restricted to these particular illustrated embodiment variants of it, but that rather also various combinations of the individual embodiment variants are possible and that this possibility of variation owing to the technical teaching provided by the present disclosure lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Substrate
2 Carrier layer
3 Security element
4 Primer
5 First substrate side
6 Second substrate side
7 Layer
8 Thickness
9 Thickness
10 Image element
11 Thickness
12 Window

The invention claimed is:

1. A substrate for producing papers of value or security papers, the substrate comprising:
- a carrier layer;
- at least one security element applied at least one of onto and into the carrier layer; and
- a primer applied onto at least one of a first substrate side of the substrate and a second substrate side of the substrate at least in some sections;
- wherein the primer is diffusely scattering;
- wherein at least one of:
- the primer is arranged, at least in some sections, above the carrier layer and the at least one security element; and
- the primer covers at least one of the at least one security element and the carrier layer at least in some sections, wherein regions of the at least one security element covered by the primer are less visible as at least one of (i) regions of the at least one security element not covered by the primer and (ii) regions of the carrier layer not covered by the primer; and
- wherein the at least one security element includes a partial, reflective layer forming an image.

2. The substrate according to claim 1, wherein the image formed by the partial, reflective layer has a mosaic image.

3. The substrate according to claim 1, wherein the substrate is one of a polymer substrate and a paper substrate.

4. The substrate according to claim 1, wherein the regions of the at least one security element covered by the primer are at least one of:
- not visible from a top view and are visible when looking through the carrier layer; and
- are better visible when looking through the carrier layer than from a top view.

5. The substrate according to claim 1, further comprising a cover layer, wherein:
- at least one of the at least one security element, the carrier layer, and the primer are covered by the cover layer at least in some sections; and
- regions of the at least one security element covered by the cover layer are less visible as at least one of (i) regions of the security element not covered by the cover layer, (ii) regions of the carrier layer not covered by the cover layer, and (iii) regions of the primer not covered by the cover layer.

6. The substrate according to claim 1, wherein the primer is applied via a printing method.

7. The substrate according to claim 1, wherein the primer is printable.

8. The substrate according claim 1, wherein the primer fully covers at least one of a surface of the carrier layer and a surface of the at least one security element.

9. The substrate according to claim 1, wherein the primer covers at least one of the carrier layer and the at least one security element partially.

10. The substrate according to claim 1, wherein at least one of:
- the carrier layer is composed of plastic; and
- the carrier layer comprises at least one of polyimide (PI), polypropylene (PP), monoaxially oriented polypropylene (MOPP), biaxially oriented polypropylene (BOPP), polyethylene (PE), polyphenylene sulfide (PPS), polyetheretherketone (PEEK), polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC), ethylene tetrafluoroethylene (ETFE), polytetrafluoroethylene (PTFE), polyvinyl fluoride (PVF), polyvinylidene fluoride (PVDF), ethylene-tetrafluoroethylene-hexafluoropropylene-fluoropolymer (EFEP), and mixtures, copolymers, and composite materials thereof.

11. The substrate according to claim 1, wherein the carrier layer has a thickness of 5 μm to 700 μm.

12. The substrate according to claim 1, wherein the primer has a thickness of 1 μm to 60 μm.

13. The substrate according to claim 1, wherein the at least one security element includes at least one of:
- an optically variable feature;
- a feature that is optically discernible in at least one of transmission and reflection;
- a machine-readable feature;
- a feature readable via one or more substances; and
- a feature that absorbs or re-emits electromagnetic waves.

14. The substrate according to claim 1, wherein the partial, reflective layer comprises at least one of (i) a metallic material, (ii) at least one high refractive index dielectric material having a refractive index larger than 1.65, (iii) a plurality of layers of metal oxides, and (iv) at least one metal material of printing inks or lacquers with metal pigments.

15. The substrate according to claim 1, wherein:

the image formed by the partial, reflective layer is formed of a plurality of image elements, which are of different sizes and shapes;

each image element of the plurality of image elements is formed by a continuous area of the partial, reflective layer; and the partial, reflective layer is interrupted between two image elements of the plurality of image elements.

16. The substrate according to claim 15, wherein, at least one of:

the image formed by the partial, reflective layer has a mosaic image; and the plurality of image elements corresponds to different mosaic images.

17. The substrate according to claim 1, further comprising a plurality of regions interrupting the partial, reflective layer, which are formed via removing a plurality of portions of the partial, reflective layer.

18. The substrate according to claim 1, wherein at least one of:

the partial, reflective layer includes a plurality of non-spared regions; and a thickness of the partial, reflective layer is the same in all of the plurality of non-spared regions of the partial, reflective layer;

wherein the non-spared regions are regions of the reflective layer where coating material is present.

19. The substrate according to claim 1, wherein:

the partial, reflective layer includes a plurality of non-spared regions; and a thickness of the partial, reflective layer is different in at least two of the non-spared regions of the partial, reflective layer;

wherein the non-spared regions are regions of the reflective layer where coating material is present.

20. The substrate according to claim 1, wherein:

the at least one security element includes at least one additional layer; and the at least one additional layer includes at least one of a protective lacquer, a heat-sealing lacquer, an adhesive, a primer, and a film.

21. A paper of value or a security paper, comprising the substrate according to claim 1.

22. A substrate for producing papers of value or security papers, the substrate comprising:

a carrier layer;

at least one security element applied at least one of onto and into the carrier layer; and a primer applied onto at least one of a first substrate side of the substrate and a second substrate side of the substrate at least in some sections;

wherein at least one of:

the primer is arranged, at least in some sections, above the carrier layer and the at least one security element; and the primer covers at least one of the at least one security element and the carrier layer at least in some sections, wherein regions of the at least one security element covered by the primer are not as well visible as at least one of (i) regions of the at least one security element not covered by the primer and (ii) regions of the carrier layer not covered by the primer; and wherein the at least one security element includes a partial reflective layer forming an image, the partial reflective layer includes at least one of:

a plurality of non-spared regions; and a thickness of the partial reflective layer is different in at least two of the non-spared regions of the partial reflective layer.

23. A substrate for producing papers of value or security papers, the substrate comprising:

a carrier layer;

at least one security element applied at least one of onto and into the carrier layer; and a primer applied onto at least one of a first substrate side of the substrate and a second substrate side of the substrate at least in some sections;

wherein the carrier layer and the primer are composed of the same material;

wherein at least one of:

the primer is arranged, at least in some sections, above the carrier layer and the at least one security element; and the primer covers at least one of the at least one security element and the carrier layer at least in some sections, wherein regions of the at least one security element covered by the primer are not as well visible as at least one of (i) regions of the at least one security element not covered by the primer and (ii) regions of the carrier layer not covered by the primer; and wherein the at least one security element includes a partial reflective layer forming an image.

* * * * *